United States Patent [19]

Schneider

[11] Patent Number: 5,560,300
[45] Date of Patent: Oct. 1, 1996

[54] SKATE TRAIN

[76] Inventor: John R. Schneider, 4 Woodside Dr. East, Apalachin, N.Y. 13732

[21] Appl. No.: 312,564

[22] Filed: Sep. 26, 1994

[51] Int. Cl.$^6$ .................................................. B61C 17/00
[52] U.S. Cl. ........................ 105/31; 105/63; 105/64.1; 105/65; 104/53; 104/155; 104/156; 104/164; 238/122
[58] Field of Search ................................. 104/53, 58, 60, 104/62, 64, 83, 85, 86, 155, 156, 164; 105/26.05, 31, 33, 34.1, 63, 64.1, 65; 238/122, 148, 151

[56]  References Cited

U.S. PATENT DOCUMENTS

| | | | |
|---|---|---|---|
| 496,759 | 5/1893 | Timby | 104/58 |
| 798,979 | 9/1905 | Reckweg | 104/85 |
| 858,624 | 7/1907 | Reckweg | 104/85 |
| 973,105 | 10/1910 | Chamberlain | 104/64 |
| 1,712,353 | 5/1929 | Meling | 105/85 |
| 3,756,161 | 9/1973 | Loosli | 105/453 |
| 3,757,702 | 9/1973 | Kreissig et al. | 105/453 |
| 3,895,787 | 7/1975 | Niehus et al. | 105/453 |
| 5,336,132 | 8/1994 | Murakami | 104/83 |

FOREIGN PATENT DOCUMENTS

| | | | |
|---|---|---|---|
| 2202505 | 9/1988 | United Kingdom | 105/33 |

*Primary Examiner*—Mark T. Le

[57]     ABSTRACT

To provide a railroad car design that allows the car to travel at high speeds over current roadbeds at very low fuel costs per mile a special rail is formed. This rail has the form of a wave shaped on its top with the troughs and crests of the wave repeating themselves every several feet apart continuously down both tracks for the whole distance of the railroad. When a wheel of this multi-wheeled car comes over the crest of a wave it has encountered as it moves down this wave formed track, the wheel immediately begins supporting its computer calculated portion of the weight of the car on a cushion of air pressure forced into its supporting air cylinder at that moment and rolls down the face of the wave in its desired direction of travel. Upon reaching the bottom of the wave's trough and starting to roll up the up hill portion of the wave form, the wheel is pushed back up into its supporting air cylinder thus expelling the trapped air by the upgrade created as the track shade ascends back up out of its trough to form the next wave crest. To stop the car, the trapped air pressure in the extended air cylinder is not allowed to exit its cylinder as fast as it normally would as each wheel is retracting on the upgrade out of its wave's trough.

7 Claims, 2 Drawing Sheets

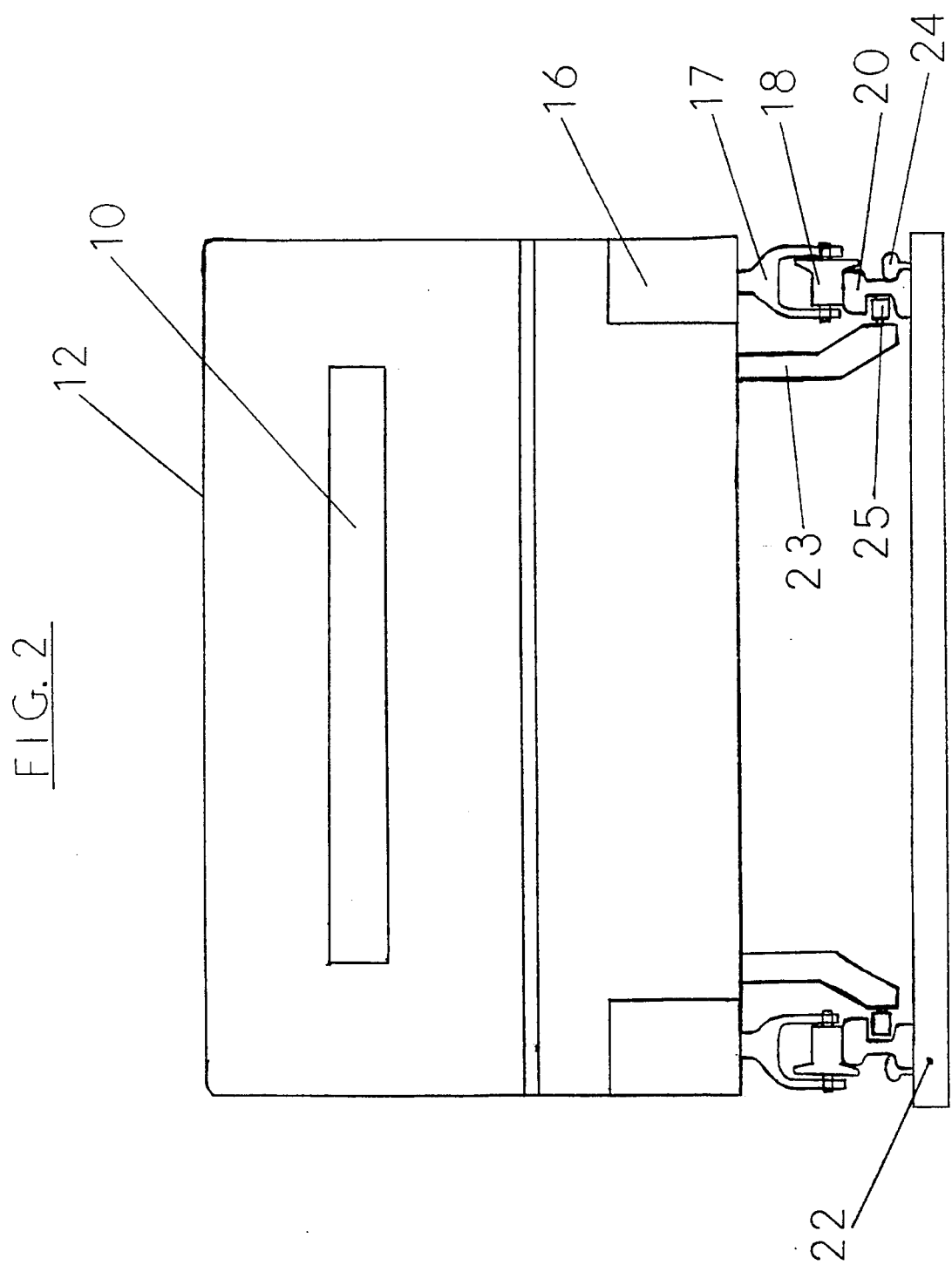

SKATE TRAIN

FIELD OF THE INVENTION

The present invention pertains to high speed railroad cars and tracks.

BACKGROUND OF THE INVENTION

To date, the common means of rolling a railroad car down its track relies on smooth and flat rails with the railroad car wheels fixed on springs of air or steel springs which absorb at most a few inches of wheel reaction to track undulations. This has the effect of limiting the train's speed since cars exhibit little tolerance to uneven tracks and sway dangerously as speed continues to increase. The obvious need is for designs for mounting the wheels so they are more tolerant of uneven tracks and also to reduce the high torque now required on the wheels so that the train can be effectively driven forward without slippage and chattering of the wheels against the track. To do this the design this invention employs allows the wheels a much greater latitude in their shock absorbing movement and significantly reduces the torque required to move the train car at high speeds. This is accomplished by causing the car to always roll downhill. To accomplish this the tracks are formed to have a wave shape on the top of the track which gives approximately half the wheels the opportunity to be rolling down hill at any one time. The other half of the wheels are of course going up hill but they are not carrying any of the train car's weight as are the other half of the Wheels which are rolling downhill.

SUMMARY OF THE INVENTION

It is an object of the present invention to produce a train car which rides on wheels that have the ability to travel up and down a foot or more in distance so that each wheel having its own computer controlled shock absorber keeps the wheel perfectly in contact with the rails and carrying just the right amount of load at the right extension.

It is another object of this invention to eliminate the need for present day driver wheels on railroad cars and to replace them with wheels that are only required to roll downhill unpowered thereby eliminating great amounts of vibration due to track and wheel misalignments that create wheel chatter and slippage.

It is a further object of this invention to provide railroad rails which have a wave form imparted to their top surface so that this undulating top surface gives the right of way made from these specially shaped rails a regular undulation of crests and troughs in a linear arrangement down the rails so that the wheels of the cars that are riding on these rails are constantly and regularly rolling first down hill and then up hill again through these waves formed on top of the rails.

It is still a further object of this invention to provide computer controls which insure that only the wheels which are rolling down hill are carrying the weight of the railroad car so the wheels rolling up hill are not loaded.

BRIEF DESCRIPTION OF THE DRAWINGS

FIG. 2 is a front view of the same car shown in FIG. 1.

DESCRIPTION OF THE PREFERRED EMBODIMENTS

Figure 1:
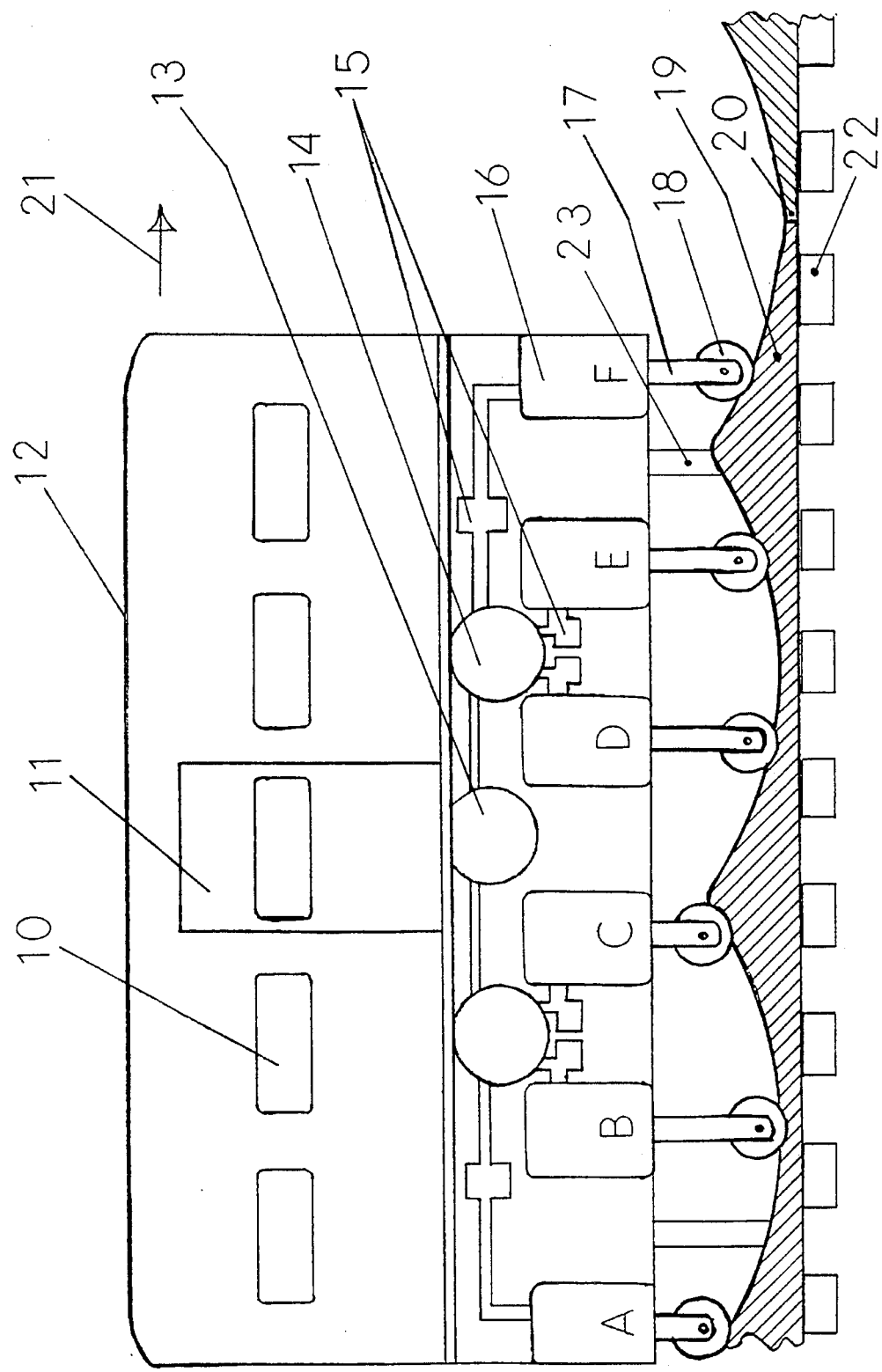
FIG. 1 is a side view of a railroad car on its tracks which embodies the invention's systems.

Referring now to the drawings wherein like reference characters indicate like parts in the several views, there is shown in FIG. 1 the railroad car's side view wherein the passenger compartment 12 with door 11 and passenger windows 10 sits upon an undercarriage that is traveling in the direction of arrow 21. Its undercarriage contains the mechanisms that operate the wheels 18. These several parts are a gas turbine electric generator and air compressor 13. A front air pressure tank 14. There is also a rear air pressure tank evidenced in the figure. Computers 15 are positioned so each of the six computers 15 shown are next to the air cylinder 16 which they individually control. The computers 15 in connection with the air pressure tanks 14 and the air cylinders 16 inherently form a controlling system in the form an electro-mechanical controller or fluid controller. The piston rod for each cylinder 17 projects downward to secure a wheel on its bottom end using an axle to support its individual wheel 18. The support bracket for the idler wheel 23 secures the train car to the track. The rail 19 displays its characteristic undulations or waves on its top which allow the wheels to first roll downhill and then up hill. The joint between the ends of abutting individual rails 20 is purposely arranged in the layout of the track for the train's right of way to occur at the lowest point in the wave form created by the undulating tracks. Since the oscillating wheels 18 of the car 12 are mechanically restrained from projecting downward from the car 12 far enough to contact that portion of the undulating track 19 the wheels 18 cannot reach down far enough to contact the lowest portion of the track 19, the joint 20 is provided between each abutting rail 19. This mechanical restraint of the wheels 18 keeps them from contacting the track 19 at the portion of the track where the track abutment joints 20 are located in the troughs of the wave formed track segments. This prevents any vibration caused by any unevenness between rail ends at the joint. The wooden ties 22 are the same as those used currently. The air cylinders and their attached wheels are marked A through F. There are a duplicate set of six air cylinders and wheels (G through L) on the far side of the car making a total of twelve wheels on the car. Of these wheels, only the ones rolling down the face of the wave which faces the direction of travel 21 (Wheels A,D and F in FIG. 1) are expected to support the weight of the car. The wheels rolling up the back face of the wave (B,C and E in FIG. 1) are not supporting any weight of the car since the air in their air cylinders has been vented to the atmosphere. The effect of this arrangement is to always have the car's weight situated totally on the wheels that are rolling downhill while the wheels rolling up hill are free to retract unopposed into their air cylinder to prepare for their next downhill run. The computer connected individually to each air cylinder monitors constantly the total number of load carrying wheels so it can calculate and effect the entry of the proper amount of air pressure into the cylinder to make that cylinder carry its share of the load at any one moment. The computer also counts the number of waves on the track that it traversed since it left the last station. This allows it to know exactly where it is and how far ahead the next car is on the same track. This system is absolutely accurate and foolproof within a few feet of the actual. With this kind of accurate tracking of the cars the population of cars on the same track can be increased many fold over the density of traffic todays railroads can sustain. That means the same roadbeds now used for train traffic will be able to carry thirty or more times the volume of traffic that they do today at speeds several times higher than today's speeds. The computer also opens the valve as the wheel reaches the bottom of its stroke so all air pressure escapes and lets the wheel retract unopposed up into its air cylinder preparatory to its next downhill roll. The computer communicates with all the eleven other computers to insure its wheel is carrying its proper share of the load and also reacting properly to bank the car around curves in the right of way so the turning forces do not act to throw the passengers to one side of the car or the other as the car negotiates the curve. When the car wants to brake to slow down the computer which receives the signal and has its wheel rolling up the back face of the track's wave will prevent some of the trapped air in the air cylinder which supports its wheel from escaping. This will have the effect of forcing the wheel against the up hill, back face of the wave enough to slow the car in its forward movement. The car cannot lift off the tracks because of the idler wheels attached to the idler wheel supports 23.

FIG. 2 shows these idler wheels 25 in the front view of the railroad car. They are fixed in place to run trapped in a slot which runs parallel to and along the bottom of the inside of the rail. There are at least four of them one of which is situated on each corner of the car. In some applications of this invention, such as on train cars expected to run in very hilly landscapes, there could be a need to apply torque to the wheels to drive them as well as using the force of gravity to move the car forward. This could be done by using a drive shaft on each wheel connected to the wheel's axle by a right angle gear train in conjunction with the rolling with gravity already shown to be the car's main motive force. In this case it would aid the wheel's traction to have a rubber wheel band around the steel wheel 18. This would be one of the options which would be obvious to anyone skilled in railroad design. Item 24 is the standard railroad spike utilized on both sides of the rail which secures the rail to the wooden tie. All other numbered items shown in FIG. 2 are already identified in FIG. 1.

At stations where some cars would want to stop, it would always require some form of switching to exit selected cars which wanted to stop off of the right of way so other cars traveling on without stopping would not be delayed. All the standard track and signaling equipment now in use on the railroads would still be useful in this SKATE TRAIN concept. Only the rails and cars change to embody this invention's concepts.

It is obvious that the spacing between the crests of the waves formed on the top of the track can be closer together than shown or farther apart. There are many reasons for this including for example the increased acceleration a closer spacing of the wave crests could effect. Over long, flat expanses of right of way a longer space between wave crests could be adequate to maintain the car's speed without needing quite so much up and down action of the wheels that closer wave crests would demand.

It is obvious that contrary to the FIG. 1 arrangement of the two rails in which they have their wave crests exactly side by side to each other that instead they could have the crest of the waves on one track occur exactly beside the other track's trough in its wave forms. This could serve to further minimize the vibrations from changes in wheel movement.

It is also obvious that other types of rail systems such as monorail systems will profit from this concept and experience great reductions in operating costs while increasing car speed and over the right of way traffic densities.

It is obvious that the embodiments of this invention could be successfully effected using many different types of materials other than those described in this patent and even different from those normally used currently by the railroads for the parts described in these FIGURES. I do not intend to limit these designs to only steel parts or some other metal. The wheels, for example, could be just like automobile tires and the rails made from cast, reinforced concrete for example.

It is also obvious that other forms of power plants could be used to generate the air pressure and electricity needed to run this car such as piston engines rather than a gas turbine.

It is also obvious to one skilled in design that this railroad car could utilize a system of cam followers and cam shafts to move its wheels up and down rather than the air cylinders I have shown. Another obvious method of implementing cams would be to have sliding bars with cam surfaces oscillating back and forth to impinge on the top end of the vertical wheel shafts in place of the air cylinders to move the wheels up and down. It is obvious that there are many different mechanical methods to control the up and down motion of the wheels once one sees the invention's method for propelling a railroad car by using such a novel method.

I claim:

1. A high speed railroad system utilizing a railroad car for use on rails with an undulating top surface, comprising:
   a) a track with an undulating top surface comprising ascending and descending sections on which a railroad car can travel;
   b) a railroad car having four corners and two sides substantially parallel to the longitudinal axis thereof and having a set of multiple railroad car wheels disposed along each of said sides;
   c) a set of axles disposed perpendicularly with respect to said axis and being operatively connected to said railroad car, for supporting said wheels;
   d) a set of piston rods operatively connected respectively to each of said axles;
   e) a set of air cylinders operatively connected respectively to each of said piston rods; and
   f) controlling means operatively connected to said air cylinders to control operation thereof, so that said air cylinders are extended when said wheels of said railroad car pass over said descending sections of said undulating track to propel said railroad car.

2. The system of claim 1, wherein said controlling means is operatively connected to said air cylinders to control operation thereof, so that said air cylinders are delayed in their retraction when said wheels of said railroad car pass over said ascending sections of said undulating track to brake said railroad car.

3. The system of claim 1, wherein said controlling means comprises a computer which is operatively connected to said air cylinders to ensure that said sides of said railroad car remain substantially level while traversing said undulating track.

4. The system of claim 1, wherein said controlling means comprises an electro-mechanical controller which is operatively connected to said air cylinders to ensure that said sides of said railroad car remain substantially level while traversing said undulating track.

5. The system of claim 1, wherein said controlling means comprises a fluid controller which is operatively connected to said air cylinders to ensure that said sides of said railroad car remain substantially level while traversing said undulating track.

6. The system as in claim 1 further comprising support pylons disposed beneath said railroad car at each of said corners thereof, and idler guide wheels operatively connected to said support pylons, said pylons holding said idler guide wheels in a continuous slot formed into said undulating rails.

7. The system as in claim 1 wherein said controlling means causes said railroad car:
   (a) to be supported in a substantially level attitude and be propelled by contacting and rolling said wheels supporting said railroad car down said descending track sections; and
   (b) to brake by contacting and dragging said wheels of said railroad car on said ascending track sections, said controlling means also monitoring right of way position of said railroad car.

* * * * *